US006829422B2

(12) United States Patent
Berkey et al.

(10) Patent No.: US 6,829,422 B2
(45) Date of Patent: Dec. 7, 2004

(54) DISPERSION SLOPE COMPENSATING OPTICAL WAVEGUIDE FIBER

(75) Inventors: George E. Berkey, Pine City, NY (US); Scott R. Bickham, Corning, NY (US); Michael B. Cain, Corning, NY (US); Pamela A. Hajcak, Corning, NY (US); Upendra H. Manyam, Corning, NY (US); Snigdharaj K. Mishra, Wilmington, NC (US); V. Srikant, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 70 days.

(21) Appl. No.: 10/354,317

(22) Filed: Jan. 30, 2003

(65) Prior Publication Data

US 2003/0142941 A1 Jul. 31, 2003

Related U.S. Application Data

(62) Division of application No. 09/822,168, filed on Mar. 30, 2001.
(60) Provisional application No. 60/193,080, filed on Mar. 30, 2000.

(51) Int. Cl.$^7$ .............................................. G02B 6/02
(52) U.S. Cl. ...................................... 385/126; 385/127
(58) Field of Search ...................... 385/123, 126–128, 385/141, 144, 145

(56) References Cited

U.S. PATENT DOCUMENTS

| 5,278,931 A | 1/1994 | Antos et al. ................. 385/126 |
| 5,838,867 A | 11/1998 | Onishi et al. ................ 385/123 |
| 6,501,892 B1 | 12/2002 | Okuno et al. ................ 385/127 |
| 2002/0191927 A1 * | 12/2002 | Liu ............................ 385/123 |

FOREIGN PATENT DOCUMENTS

| GB | 0 554 714 | 8/1993 | ............ H04B/10/18 |
| WO | WO 98/04941 | 2/1998 | ............ G02B/6/22 |
| WO | WO 99/42869 | 8/1999 | ............ G02B/6/16 |

OTHER PUBLICATIONS

Berkey et al., "Negative Slope Dispersion Compensating Fibers", Optical Fiber Communication Conference Technical Digest, 1999, vol. 2, pp. 235–237.*
AMP, "Designers Guide to Fiber Optics", AMP, Inc., Harrisburg, PA, 1982, p. 2.*
Vengsarkar et al., Characterization of Dispersion Compensating Fibers, Technical Digest Sympsoium on Optical Fiber Measurements, 1994, pp. 175–180.
Nielsen et al., Dispersion Compensating Fibres and Perspectives for Future Developments, ECOC 2000, pp. 91–94.
Yanada et al., Dual–band Hybrid Transmission Line Consisting of Pure Silica core Fiber and Dispersion Compensating Fiber, Optical Fiber Communication Conference, Mar. 7, 2000, pp. 92–94.
Nissov, et al., 32×20 Gb/s Transmission over Trans–Atlantic Distance (6,200 km) with 31% Spectral Efficiency, Optical Fiber Communication Conference, Mar. 7–10, 2000, PD30–1 through PD30–3.
R. Sugizaki, Dispersion Slope Compensating Fibers for L–Band WDM Systems using NZ–DSF, Optical Fiber Communication Conference, Mar. 7–10, 2000, pp. 95–97.

(List continued on next page.)

Primary Examiner—Akm Enayet Ullah
Assistant Examiner—Michelle R. Connelly-Cushwa
(74) Attorney, Agent, or Firm—Randall S. Wayland; William J. Chervenak

(57) ABSTRACT

Disclosed is a dispersion compensating and dispersion slope compensating single mode optical waveguide fiber. The refractive index profiles of waveguide fibers in accord with the invention are disclosed and described. These index profiles provide a waveguide fiber having negative total dispersion and negative total dispersion slope so that a standard waveguide fiber is compensated over an extended wavelength range. A telecommunications link using the fiber in accord with the invention is also disclosed and described. A standard fiber to compensating fiber length ratio in the range of 1:1 to 3:1 is shown to give optimum link performance with respect to limiting non-linear dispersion effects.

14 Claims, 9 Drawing Sheets

OTHER PUBLICATIONS

Bhagavatula et al., Novel Fibers for Dispersion–Managed high–bit–rate Systems, OFC '98 Technical Digest, pp. 21–22.

Tsukitani et al., Low–loss Dispersion–flattened Hybrid Transmission Lines Consisting of Low–nonlinearity Pure Silica Core Fibres and Dispersion Compensating Fibres, Electronics Letters, vol. 36, No. 1, Jan. 6, 2000, pp. 64–66.

Berkey et al., Negative Slope Dispersion Compensating Fibers, Conference on Optical Fiber Communications, Feb. 16–21, 1997, pp. 235–237.

Semenov et al., Broadband Dispersion–Compensating Fiber for High–Bit–Rate Transmission Network Use, Applied Optics, vol. 34, No. 24, Aug. 20, 1995, pp. 5331–5337.

* cited by examiner

DISPERSION SLOPE COMPENSATING OPTICAL WAVEGUIDE FIBER

This is a divisional of U.S. patent application Ser. No. 09/822,168 filed on Mar. 30, 2001, the content of which is relied upon and incorporated herein by reference in its entirety, and the benefit of priority under 35 U.S.C. §120 is hereby claimed. This application further claims priority to and the benefit of U.S. Provisional Patent Application No. 60/193,080 filed Mar. 30, 2000.

BACKGROUND OF THE INVENTION

1. Field of the Invention

The present invention relates generally to an optical waveguide fiber, and particularly to an optical waveguide fiber that compensates dispersion slope in a telecommunications link.

2. Technical Background

Dispersion compensation techniques in telecommunications systems or links have been used successfully. A technique useful in links already installed is one in which total dispersion (also called chromatic dispersion) is compensated by an appropriately designed waveguide fiber formed into a module that can be inserted into the link at an access point such as an end of the link. The compensating waveguide fiber can be designed to allow operation in, for example, the 1550 nm operating wavelength window of a link originally designed for the 1310 nm operating window.

A disadvantage of compensating with a module is that attenuation and nonlinear penalties are added to the link without increasing the useful link length. Also some of the refractive index profile designs for dispersion compensation are more difficult to manufacture and have higher attenuation than the fibers making up the link.

Another dispersion compensation scheme is to include both positive and negative dispersion fibers in the cables of the link. Each cable can contain both positive and negative total dispersion waveguide fibers, or the link can be formed using cables having only positive dispersion together with cables having only negative dispersion. The relatively high attenuation and low effective area of the negative dispersion fiber can be a problem in this scheme as it is in the dispersion compensating module solution. Also the cable inventory must be managed carefully, because replacing or repairing a cable involves tracking of another variable (the sign of the dispersion of fibers in the cable). In certain profile designs a mismatch of mode fields between the positive and negative total dispersion fibers exists and results in excessive splice or connecting losses.

There is therefore a need for a total dispersion compensating strategy in which the compensating fiber is a part of the link length and the problem of the compensating fiber producing excess link attenuation is addressed. Furthermore, a solution that includes introducing negative dispersion cabled fiber into the link must offer a benefit that offsets the cost of cable inventory management and that does not introduce excess splice loss into the link.

A further desired characteristic of a total dispersion compensation solution is that the compensation be effective over an extended bandwidth to facilitate use of wavelength division multiplexed link architectures.

DEFINITIONS

The following definitions are in accord with common usage in the art.

The refractive index profile is the relationship between refractive index or relative refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are set forth in the figures and the discussion thereof.

Total dispersion, sometimes called chromatic dispersion, of a waveguide fiber is the sum of the material dispersion, the waveguide dispersion, and the inter-modal dispersion. In the case of single mode waveguide fibers the inter-modal dispersion is zero.

The sign convention generally applied to the total dispersion is as follows. Total dispersion is said to be positive if shorter wavelength signals travel faster than longer wavelength signals in the waveguide. Conversely, in a negative total dispersion waveguide, signals of longer wavelength travel faster.

The effective area is $A_{eff}=2\Pi(\int E^2\, r\, dr)^2/(\int E^4\, r\, dr)$, where the integration limits are 0 to $\infty$, and E is the electric field associated with light propagated in the waveguide.

The relative refractive index percent, $\Delta\% = 100 \times (n_i^2 - n_c^2)/2n_i^2$, where $n_i$ is the maximum refractive index in region i, unless otherwise specified, and $n_c$ is the average refractive index of the cladding region. In those cases in which the refractive index of a segment is less than the average refractive index of the cladding region, the relative index percent is negative and is calculated at the point at which the relative index in most negative unless otherwise specified.

The term α-profile refers to a refractive index profile, expressed in terms of $\Delta(b)$ %, where b is radius, which follows the equation, $\Delta(b)\% = \Delta(b_o)(1-[|b-b_o|/(b_i-b_o)]^\alpha)$, where $b_o$ is the point at which $\Delta(b)\%$ is maximum, $b_1$ is the point at which $\Delta(b)\%$ is zero, and b is in the range $b_i \leq b \leq b_f$, where delta is defined above, $b_i$ is the initial point of the α-profile, $b_f$ is the final point of the α-profile, and α is an exponent which is a real number.

The pin array bend test is used to compare relative resistance of waveguide fibers to bending. To perform this test, attenuation loss is measured for a waveguide fiber with essentially no induced bending loss. The waveguide fiber is then woven about the pin array and attenuation again measured. The loss induced by bending is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to a portion of the periphery of the pins. The test pertains to macro-bend resistance of the waveguide fiber.

A waveguide fiber telecommunications link, or simply a link, is made up of a transmitter of light signals, a receiver of light signals, and a length of waveguide fiber having respective ends optically coupled to the transmitter and receiver to propagate light signals therebetween. A link can include additional optical components such as optical amplifiers, optical attenuators, optical switches, optical filters, or multiplexing or demultiplexing devices. One may denote a group of inter-connected links as a, telecommunications system.

SUMMARY OF THE INVENTION

One aspect of the present invention is a single mode optical waveguide fiber, having a core region and a surrounding clad layer. The reference to single mode waveguide fiber means that the fiber in cable form usually will carry only a single mode over the range of operating wavelengths. Persons skilled in the art understand that single mode operation also includes cases in which more than one mode is propagated but that the higher order modes may are strongly attenuated and so do not travel in the waveguide more than a few kilometers. The waveguide fiber in accord with the invention may also be used in a wavelength range where a few modes are propagated the full link length and the few modes are dispersion compensated. The core region includes at least three segments, a central segment beginning at the centerline of the waveguide fiber, and two annular segments surrounding the central segment. In one embodiment, the profile has four segments, a central segment, surrounded by a first, second and third annular segment. Each of the segments is characterized by a refractive index profile, a relative refractive index, and an inner and an outer radius. The respective segment characteristics are selected to provide a waveguide fiber having a total dispersion at 1550 nm in the range of −30 ps/nm-km to −60 ps/nm-km and preferably in the range of −30 ps/nm-km to −48 ps/nm-km, total dispersion slope at 1550 nm in the range of −0.09 ps/nm$^2$-km to −0.18 ps/nm$^2$-km and preferably in the range of −0.09 ps/nm$^2$-km to −0.15 ps/nm$^2$-km, an effective area at 1550 nm greater than 25 μm$^2$, and attenuation at 1550 nm less than or equal to 0.30 dB/km. In a preferred embodiment, the attenuation at 1550 is less than or equal to 0.26 dB/km.

The respective relative indexes, symbolized beginning at the central segment as $\Delta_0$, the first annular segment (4 in FIG. 1) $\Delta_1$, and second annular segment (6 in FIG. 1) $\Delta_2$, are related by the inequalities, $\Delta_o > \Delta_2 > \Delta_1$, and $\Delta_1 < 0$.

In an embodiment of the single mode optical waveguide fiber in accord with the invention, the central segment has relative index percent in the range of 0.8% to 1.4% and preferably in the range 0.9% to 1.2%, the first annular segment has relative index percent in the range of −0.3% to −0.5% and preferably −0.35% to −0.45%, and the second annular segment has relative index percent in the range of 0.20% to 0.45%. The respective radii associated with this embodiment are for the central segment an inner radius zero and outer radius, $r_o$, in the range 1.8 μm to 3.0 μm, for the first annular segment an inner radius $r_o$ and outer radius in the range $r_o+1.5$ μm to $r_o+3.0$ μm, and for the second annular segment a center radius in the range 4.5 μm to 10 μm and a width, measured between two points defined by the intersection of the second annular segment refractive index profile with a horizontal line drawn at the half relative index percent value of the second annular segment refractive index profile, in the range of 0.3 μm to 4.0 μm.

In another embodiment in accord with the invention, the central segment of the single mode optical waveguide fiber includes a SiO$_2$ layer at the interface of the central segment and the first annular segment. This SiO$_2$ layer is no thicker than 1.5 μm. The composition of the layer ranges from pure SiO$_2$ to 90% SiO$_2$.

In a further embodiment of the waveguide fiber profile, there is a flattened region of refractive index beginning at the outer radius of the first annular segment. The width of this region is no greater than 5.0 μm.

In yet another embodiment in accord with the invention, the clad layer adjacent the core region has a refractive index less than that of SiO$_2$. This portion of the clad layer has a thickness no greater than 20 μm. For most refractive index profile designs of optical waveguide fibers, no light is present at a radius about 20 μm greater than the core radius.

A second aspect of the invention is a telecommunications link which makes use of two types of waveguide fibers. A first waveguide type has positive total dispersion and positive total dispersion slope. A second type, made in accord with the invention, has negative total dispersion and negative total dispersion slope. Combining the two fiber types in a link allows one to compensate for accumulated positive dispersion in the first waveguide type by using, in the link, an appropriate length of negative total dispersion waveguide fiber. The difference in sign of the respective slopes of the first and second waveguide types provides for total dispersion compensation over an extended range of operating wavelengths. In addition, the negative dispersion waveguide fiber can provide a net negative dispersion in each span which mitigates nonlinear penalties due to modulational instability and four wave mixing. This accumulated negative dispersion is then compensated periodically by single spans of the positive dispersion waveguide fiber.

The link includes a transmitter that provides light signals, a receiver that receives the light signals, and at least two lengths of optical waveguide fiber optically coupled between the transmitter and receiver to transport the light signals. At least one of the waveguide fiber lengths has positive total dispersion and total dispersion slope. At least one of the waveguide fiber lengths has negative total dispersion and negative total dispersion slope. The length, total dispersion, and total dispersion slope of the fibers are chosen to provide a link length having a magnitude (as used herein, magnitude refers to absolute value of either a positive or negative total dispersion or total dispersion slope) of total dispersion and total dispersion slope less than 10 ps/nm-km and 0.01 ps/nm$^2$-km, respectively. The combination of fibers having total dispersion of different sign serve to reduce or eliminate the signal dispersion. Because the fibers also have total dispersion slope of different sign, the canceling of signal dispersion takes place over an extended wavelength range.

In an embodiment of the link, the signal dispersion cancellation is effective over a wavelength range 1280 nm to 1650 nm so that the operating window includes wavelengths near 1310 nm as well as the C-band (1530 nm to 1565 nm) and L-band (1565 nm to 1650 nm). The dispersion data show that operation over this very wide wavelength band is possible.

In another embodiment of the link, the optical waveguide fiber having positive total dispersion and total dispersion slope is longer than the optical waveguide fiber having negative total dispersion and total dispersion slope. A preferred embodiment is one in which the positive total dispersion fiber is at least twice as long as the negative total dispersion fiber. Because of the characteristics of the refractive index profile of the negative total dispersion fiber, this fiber generally exhibits a higher attenuation relative to that of the positive total dispersion fiber. Therefore, the link attenuation is reduced when dispersion compensation can be achieved using a shorter length of negative total dispersion fiber.

In a further embodiment of the invention, the link is constructed so that the negative total dispersion fiber is farthest from the transmitter. The advantage of this construction is due to the higher effective area of the positive total dispersion waveguide compared to the effective area of the negative total dispersion waveguide. Non-linear dispersion effects, such as cross phase modulation and four wave mixing, are known to depend upon the ratio of power density in the waveguide fiber to effective to effective area of the fiber. By placing the higher effective area waveguide fiber nearest the transmitter, the higher power signal propagates in the larger effective area fiber. The signal is attenuated before reaching the lower effective area, negative total dispersion fiber so that the non-linear dispersion effects are kept to a minimum.

In telecommunications links designed for two way signal propagation in the waveguide fiber, the non-linear effects are minimized by placing the lower effective area waveguide fiber in the center of the link between two segments of the link constructed of the higher effective area waveguide fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
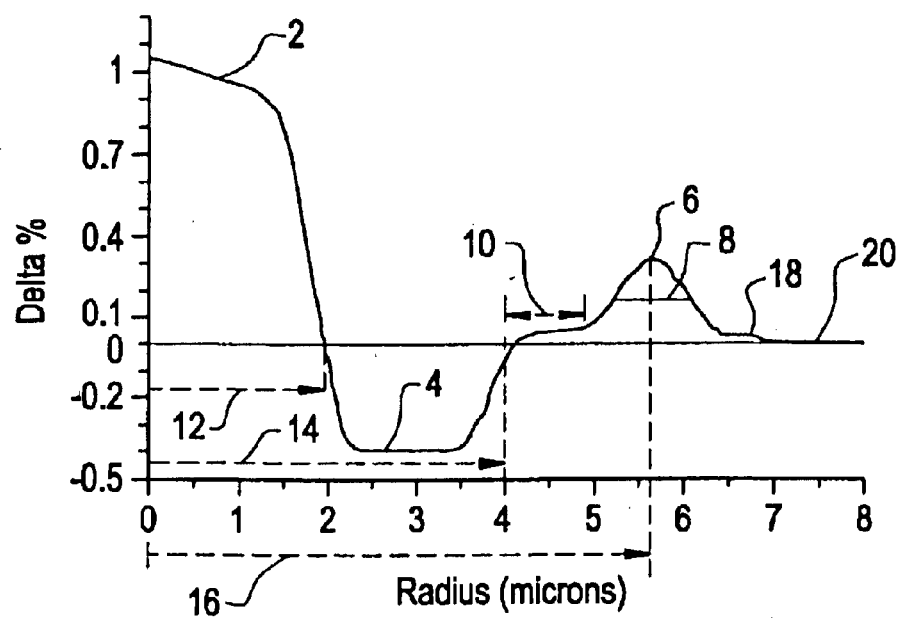
FIG. 1 is an illustration of a refractive index profile that exhibits the main features of the invention.

Reference will now be made in detail to the present preferred embodiments of the invention, examples of which are illustrated in the accompanying drawings. An exemplary embodiment of the waveguide fiber refractive index profile of the present invention is shown in FIG. 1. The refractive index profile includes a core region, which begins at the waveguide fiber centerline and ends at point 18 where the final segment of the core abuts the surrounding clad layer 20. Central segment 2 has a positive relative index percent, $\Delta_0\%$, an inner radius of 0 and an outer radius 12 measured from the centerline to the point at which the descending portion of segment 2 crosses the horizontal axis, i.e., $\Delta\%$ equal to zero. First annular segment 4 has a negative relative index $\Delta_1\%$, inner radius 12 and outer radius 14 measured from the centerline to the point at which the ascending portion of segment 4 crosses the horizontal axis. Second annular segment 6 includes a flattened region having inner radius 14 and width 10, measure from inner radius 14 to the point at which the ascending portion of segment 6 begins, and a region of raised index having center radius 16 and width 8. The center radius 16 is measured from the centerline to the point at which the raised index is a maximum, that is, at the relative index point $\Delta_2\%$. For those profiles having a flattened segment 6, the center radius 16, such as that shown in FIG. 12, the radius 16 is measured from the centerline to the center of width 8. The width 8 is measured between the points of intersection of the half maximum relative index line and the ascending and descending portions of the raised index region.

These definitions of radius described in terms of FIG. 1 are applied consistently to FIGS. 1-4 and 12 which are all illustrations of refractive index profiles in accord with the invention. In the interest of brevity and clarity the corresponding parts of the profiles in each of FIGS. 1-4 and 12 will have the same number and the definitions of the radii and widths will not be repeated.

Figure 12:
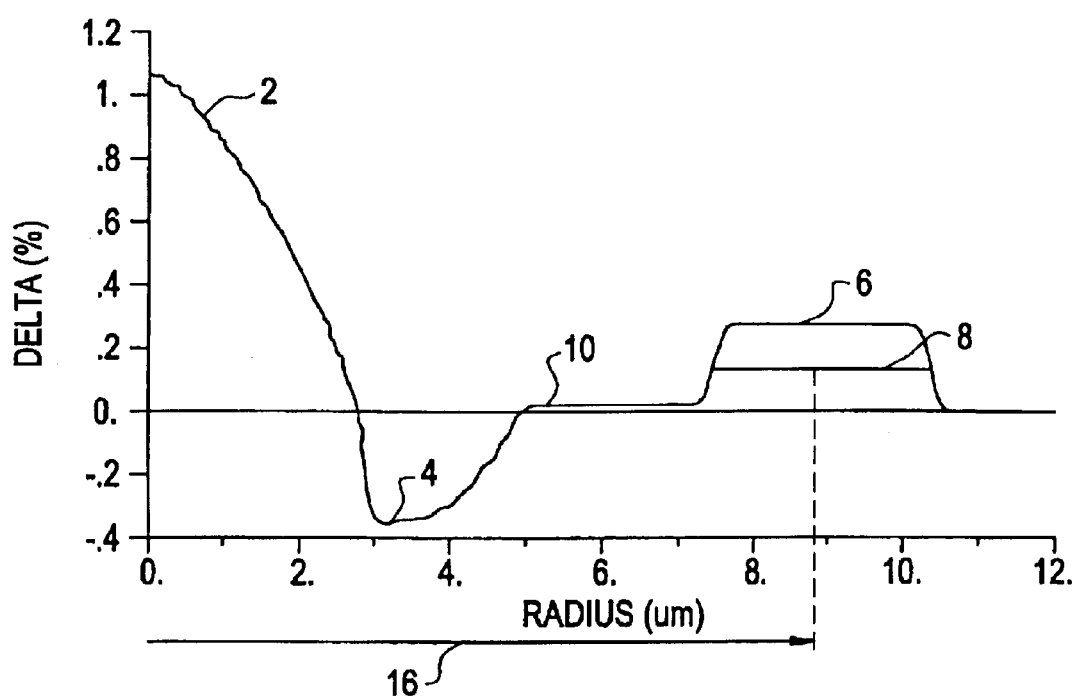
FIG. 12 is an illustration of a refractive index profile of an embodiment of the invention.

The shape of the central segment in FIGS. 1-4 is described as being a rounded trapezoid. More particularly, the term rounded trapezoid refers to a central segment having an inner portion beginning at or near the centerline and having a first slope and an adjacent second portion having a second slope. The slope of the second portion is greater than that of the first portion. The slope of the first portion is in the range 0 to $-0.2/\mu m$. In FIG. 12, the shape of the central segment is rounded and can be described as an $\alpha$-profile having $\alpha$ in the range of 1 to 3.

EXAMPLE 1

A refractive index profile was modeled using the $\Delta\%$ values and radius values shown in FIG. 1. Central segment 2 has $\Delta_0\%$ of 1.05%, outer radius 1.8 $\mu m$, and a rounded trapezoidal shape; first annular segment 4 has $\Delta_1\%$ of $-0.4\%$, outer radius 4.0 $\mu m$, and a rounded step shape; second annular segment 6 has a flattened region of width 0.9 $\mu m$ and relative index near zero (the slight rise in the index of the flattened region is due to dopant diffusion and is accounted for in the model calculations), and a raised index region $\Delta_2\%$ of 0.3%, center radius, 5.6 $\mu m$, width 0.85 $\mu m$, and a symmetrical rounded shape This shape can be generated using the proper α in the α-profile equation set forth above.

The modeled properties of this profile are effective area 26 $\mu m^2$, total dispersion slope −0.11 ps/nm²-km at 1550 nm, total dispersion −39 ps/nm-km at 1550 nm, attenuation 0.233 dB/km at 1550 nm, fiber cut off wavelength 1426 nm, and pin array bend loss 4.1 dB.

The modeled waveguide fiber has respective total dispersion slope and total dispersion of about 2× that of standard step index single mode optical waveguide fiber, having a dispersion zero in the 1310 nm operating window, but of opposite sign. Using a length ratio of approximately 2:1, the waveguide fiber of this example can be used to compensate the total dispersion slope of standard single mode optical waveguide fiber, while yielding a residual negative total dispersion. The effective area of the compensating fiber is reasonable and the attenuation and pin array loss is excellent.

COMPARATIVE EXAMPLE 2

Figure 2:
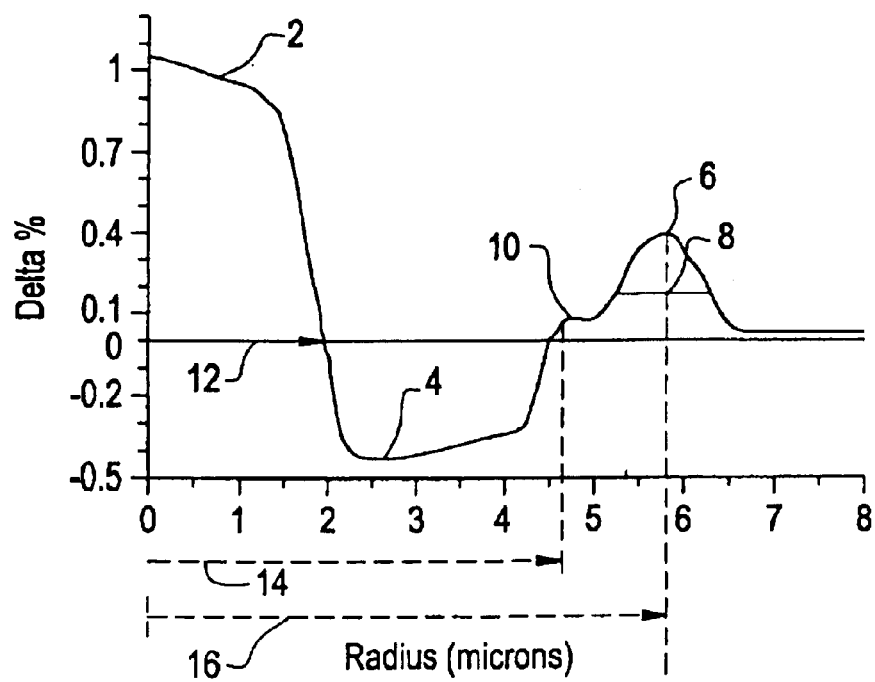
FIG. 2 is an illustration of a refractive index profile of an embodiment of the invention.

A second refractive index profile was modeled using the Δ% values and radius values shown in FIG. 2. Central segment 2 is identical to that of FIG. 1, annular segment 4 has $\Delta_1\%$ of −0.4%, outer radius 4.6 $\mu m$, and a trapezoidal shape having a linear portion of positive slope that begins at $\Delta_1\%$ and ends at a relative index of −0.3%; second annular segment 6 has a flattened region, 10, of width 0.33 $\mu m$ and relative index near zero, and a raised index region $\Delta_2\%$ of 0.4%, center radius, 5.8 $\mu m$, width 1.0 $\mu m$, and a symmetrical rounded shape. This shape can be generated using the proper α in the α-profile equation set forth above.

The modeled properties of this profile are effective area 25 $\mu m^2$, total dispersion slope −0.16 ps/nm²-km at 1550 nm, total dispersion −36 ps/nm-km at 1550 nm, attenuation 0.234 dB/km at 1550 nm, fiber cut off wavelength 1545 nm, and pin array bend loss 3.1 dB.

These properties are within the desired ranges for a compensating fiber. It will be understood that the agreement between the modeled and measured dispersion properties depends upon the accuracy of the model. Broadening the first annular region and raising the relative index of the second annular region serves to improve bend resistance, increase the total dispersion slope, and increase cut off wavelength. The better bend resistance is achieved at the cost of a slight decrease in effective area.

EXAMPLE 3

Figure 4:
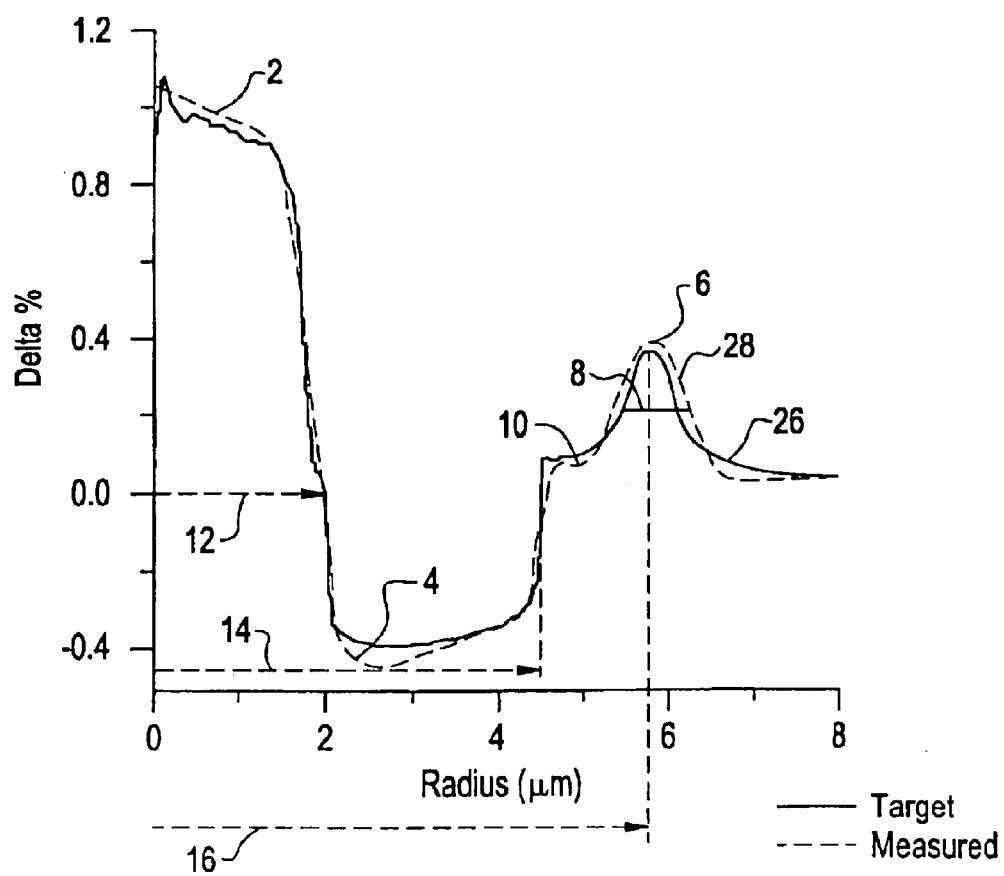
FIG. 4 is a chart showing the comparison between a target refractive index profile and a measured refractive index profile of a fiber manufactured in accord with the invention.

Waveguide fiber in accord with the invention was manufactured and had a refractive index profile as shown in FIG. 4. The target profile is shown as solid line 26 in FIG. 4. The profile as manufactured is shown the dashed line 28. The close tracking between the target profile and the manufactured profile shows good process control. Taking the relative index percent values and radius values of the dashed line 28, the central segment 2 has $\Delta_0\%$ of 1.05%, outside radius, 12 of 2 $\mu m$, annular segment 4 has $\Delta_1\%$ of −0.42%, outer radius 4.6 $\mu m$, and a trapezoidal shape having a linear portion of positive slope that begins at $\Delta_1\%$ and ends at a relative index of −0.33%; second annular segment 6 has a flattened region, 10, of width 0.3 $\mu m$ and relative index near zero, and a raised index region $\Delta_2\%$ of 0.4%, center radius 16, 5.3 $\mu m$, width 1.0 $\mu m$, and a symmetrical rounded shape.

The properties of the waveguide fiber were effective area 26 $\mu m^2$, total dispersion at 1550 nm, −40 ps/nm-km, total dispersion slope at 1550 nm of −0.11 ps/nm²-km, and attenuation at 1550 nm of 0.255 dB/km, in good agreement with the model.

Figure 3:
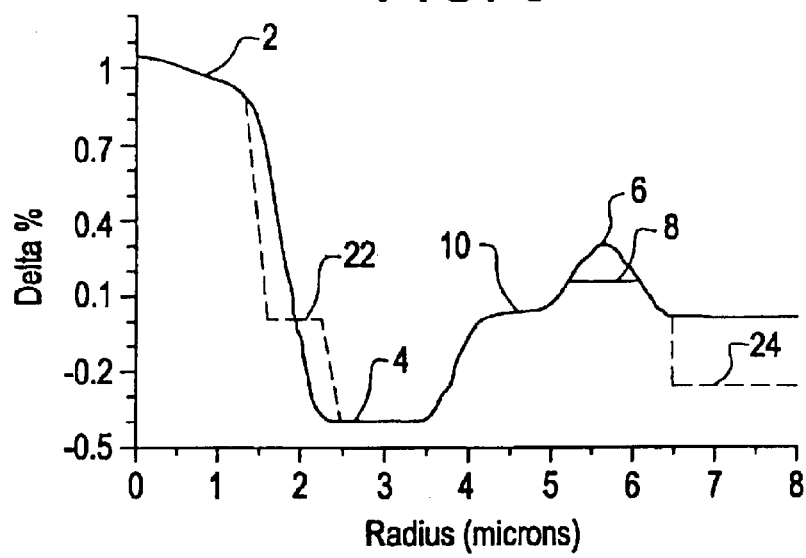
FIG. 3 is an illustration of a refractive index profile of an embodiment of the invention.

FIG. 3 shows variations on the embodiment of FIGS. 1 and 2. A layer of $SiO_2$ glass 22 can be interposed between the central segment 2 and the first annular region 4. The index of refraction of this layer can be slightly above that of $SiO_2$ due to dopant diffusion from adjacent segments during manufacturing. The width of the layer is no greater than 1.5 $\mu m$. In addition, a portion of the clad layer 20 adjacent the second annular region 6, may be designed to have a refractive index less than that of $SiO_2$, as shown by dashed line 24. The thickness of clad portion 24 is less than 20 $\mu m$. Layers 22 and 24 provide two additional parameters to adjust in achieving the desired waveguide fiber properties. Further, the presence of a clad portion 24 serves to increase bend resistance. The buffer layer 22 serves to decrease diffusion of index increasing material from central segment 2 into first annular segment 4.

EXAMPLE 4

An additional refractive index profile was modeled using the Δ% values and radius values shown in FIG. 12. Central segment 2 can be described by the equation of an α-profile where α is about 1.47. The relative index $\Delta_0\%$ is 1.08% and the central segment radius is 2.86 $\mu m$. The profile can be made to exhibit the desired for a range of α values. For example a range of α values from 1 to 3 can be used. Annular segment 4 has $\Delta_1\%$ of −0.353%, outer radius 4.9 $\mu m$, and an α-profile shape; second annular segment 6 has a flattened region, 10, of width 2.5 $\mu m$ and relative index near zero, and a raised, flattened index region having $\Delta_2\%$ of 0.26%, center radius, 8.95 $\mu m$, width 2.9 $\mu m$.

The modeled properties of this profile are effective area 34.1 $\mu m^2$, total dispersion slope −0.115 ps/nm²-km at 1550 nm, total dispersion −32 ps/nm-km at 1550 nm, attenuation 0.215 dB/km at 1550 nm, fiber cut off wavelength 2070 nm, and pin array bend loss 6.58 dB.

Figure 5:
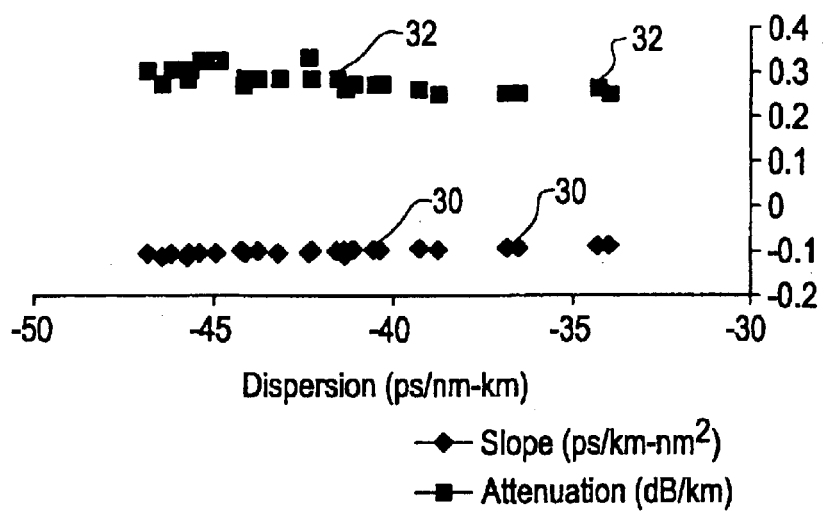
FIG. 5 is a chart of total dispersion at 1550 nm versus total dispersion slope at 1550 nm and total dispersion at 1550 nm versus attenuation at 1550 nm for waveguide fibers made in accord with the invention.

A number of waveguide fibers were made in accord with the invention and their attenuation, total dispersion, and total dispersion slope measured at 1550 nm. Results of the measurements are shown in FIG. 5. The total dispersion ranged from about −34 ps/nm-km to −47 ps/nm-km. Over this total dispersion range, the total dispersion slope remained essentially constant at −0.10 ps/nm²-km, as can be seen from points 30 in FIG. 5. The attenuation at 1550 remained within a range of about 0.24 dB/km to 0.33 dB/km over this total dispersion range as shown by points 32 in FIG. 5. The data shows the refractive index profile in accord with the invention to be relatively easily and reproducibly manufactured.

Figure 6:
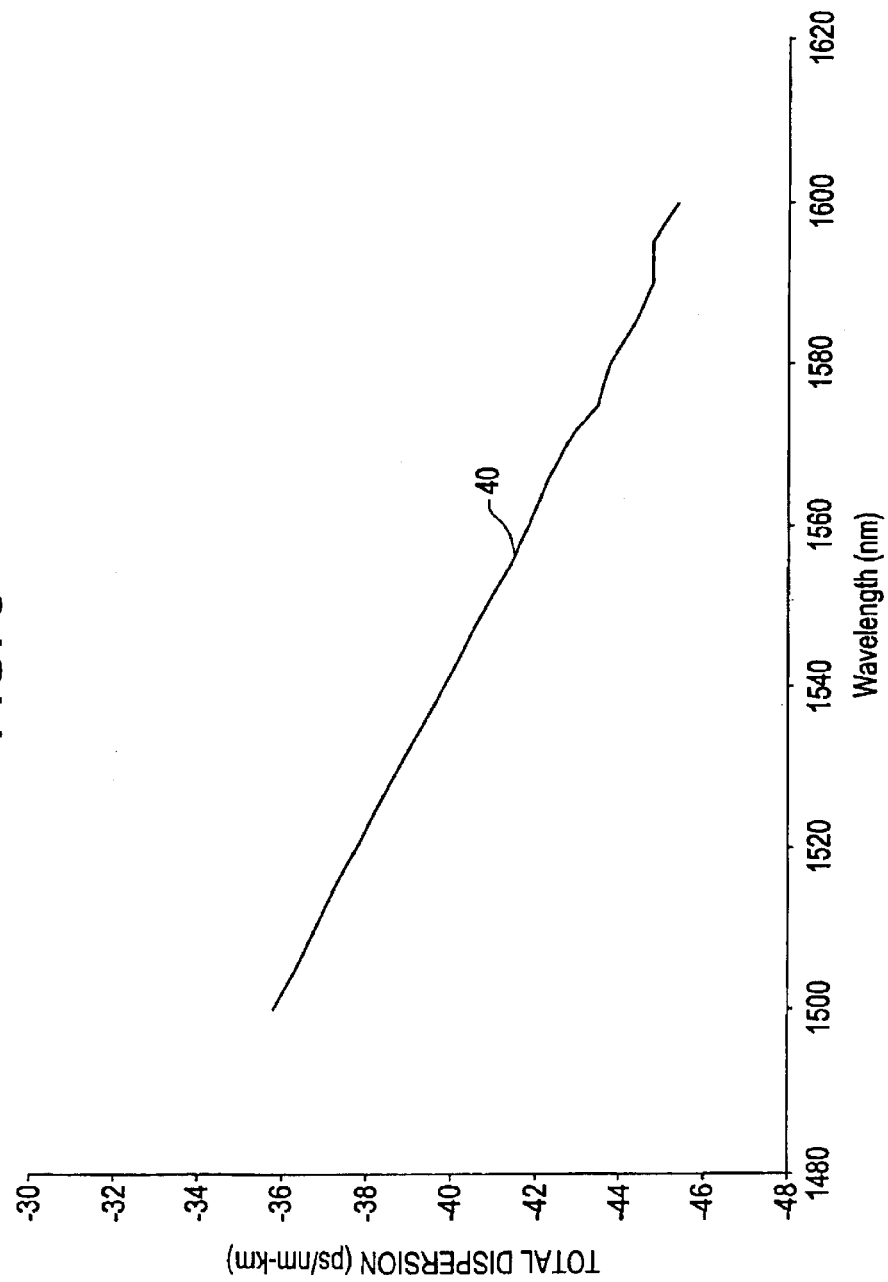
FIG. 6 is a chart showing total dispersion versus operating wavelength for a waveguide fiber manufactured in accord with the invention.
Figure 7:
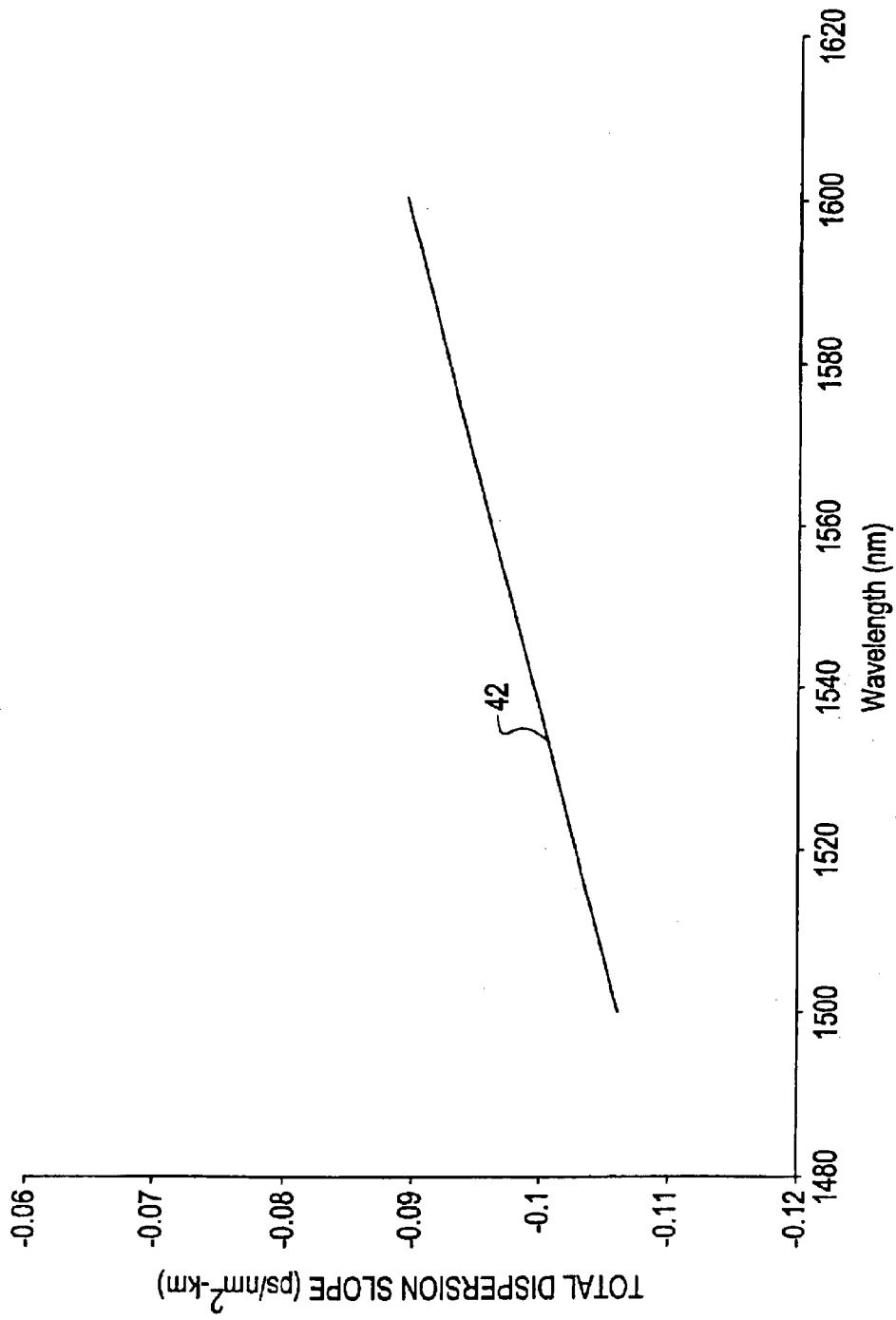
FIG. 7 is a chart showing total dispersion slope versus operating wavelength for a waveguide fiber manufactured in accord with the invention.

A telecommunications link was modeled over a wavelength range of 1500 nm to 1600 nm using measured properties of both the positive and compensating negative total dispersion single mode optical waveguide fibers. Curve 40 of FIG. 6 shows the total dispersion of the compensating fiber as varying between −36 ps/nm-km and −46 ps/nm-km over the 1500 nm to 1600 nm range. Curve 42 of FIG. 7 shows the total dispersion slope of the compensating fiber remains within a range −0.09 ps/nm²-km to −0.11 ps/nm²-km over this wavelength range.

Figure 9:
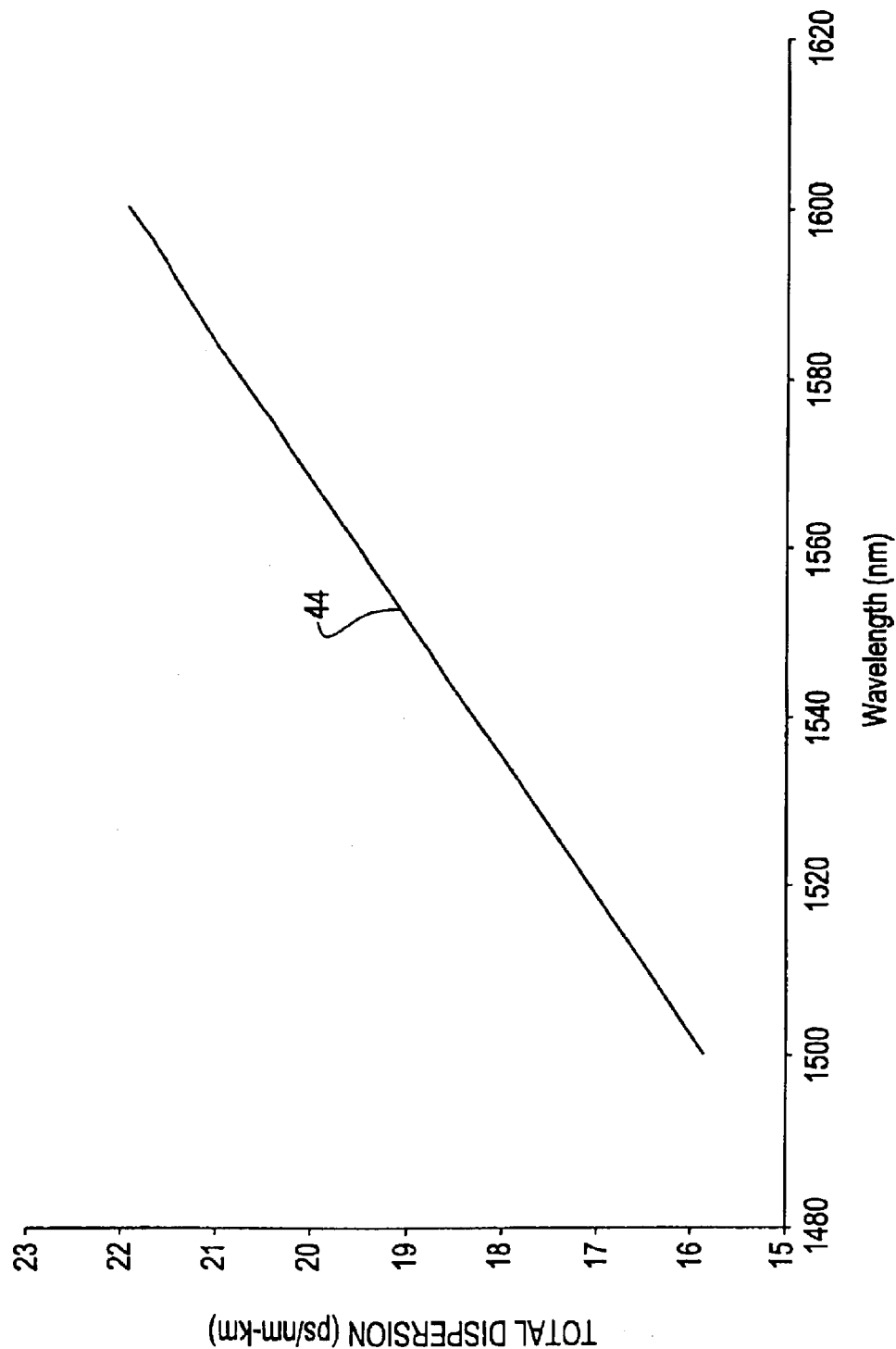
FIG. 9 is a chart showing total dispersion versus operating wavelength for a waveguide fiber to be compensated by a waveguide fiber manufactured in accord with the invention.
Figure 10:
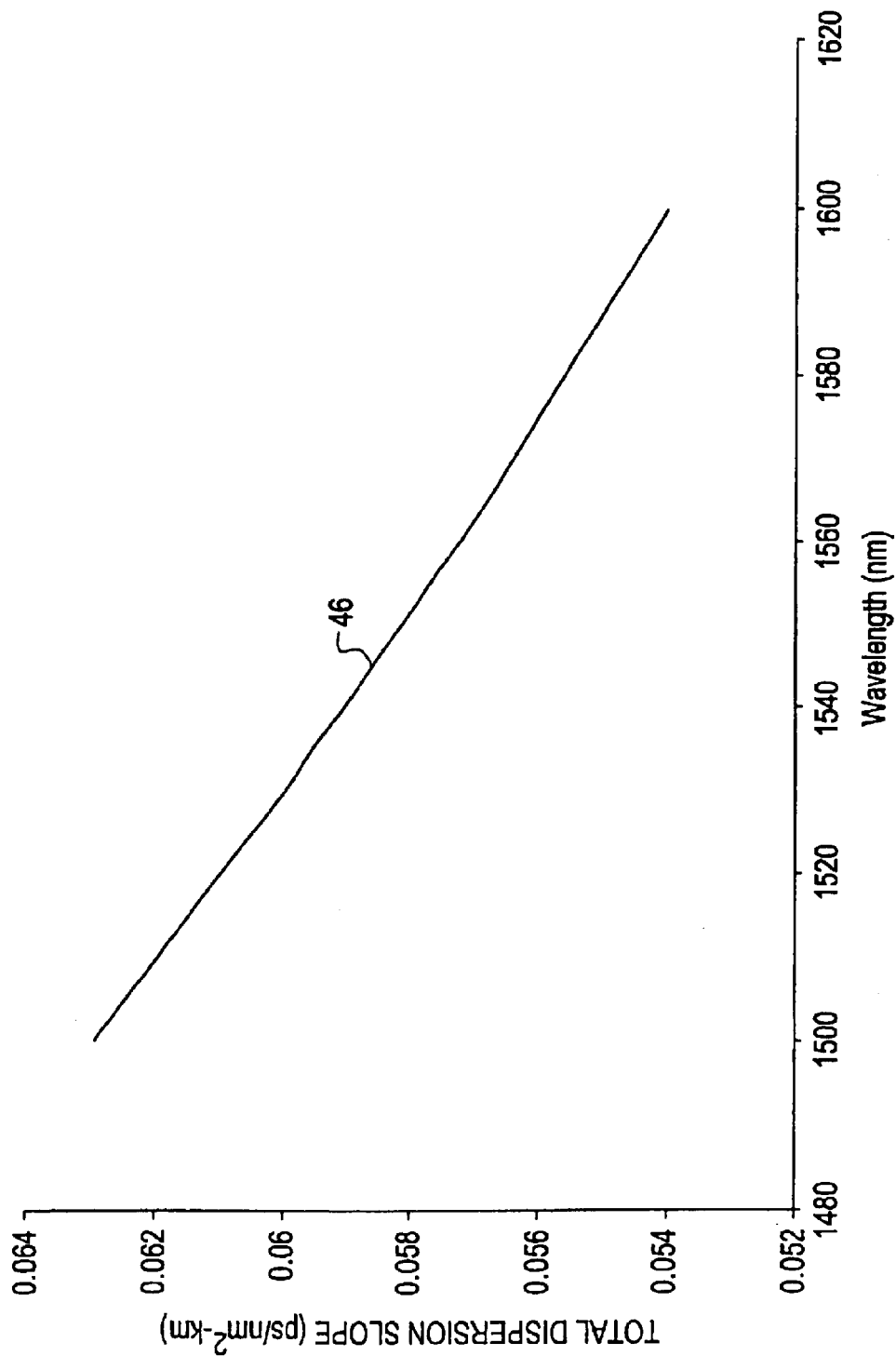
FIG. 10 is a chart showing total dispersion slope versus operating wavelength for a waveguide fiber to be compensated by a waveguide manufactured in accord with the invention.

Properties of the fiber to be compensated, a standard single mode optical waveguide fiber as described above, are shown in FIGS. 9 and 10. Curve 44 of FIG. 9 shows the total dispersion of the standard fiber over the specified wavelength range varies linearly from 16 ps/nm-km at 1500 nm to 22 ps/nm-km at 1600 nm. Curve 46 of FIG. 10 shows the total dispersion slope of the standard fiber over the specified wavelength range varies linearly from 0.063 ps/nm$^2$-km at 1500 nm to 0.054 ps/nm$^2$-km at 1600 nm. A comparison of curve 40 of FIG. 6 to curve 44 of FIG. 9 shows the compensation fiber has total dispersion which mirrors the total dispersion of the positive dispersion fiber over the wavelength range. The total dispersion magnitude of the compensating fiber is about twice that of the standard fiber over the wavelength range. A comparison of curve 42 of FIG. 7 to curve 46 of FIG. 9 shows an analogous relationship between the respective slopes over the wavelength range of the compensating waveguide fiber and the standard waveguide fiber.

Figure 8:
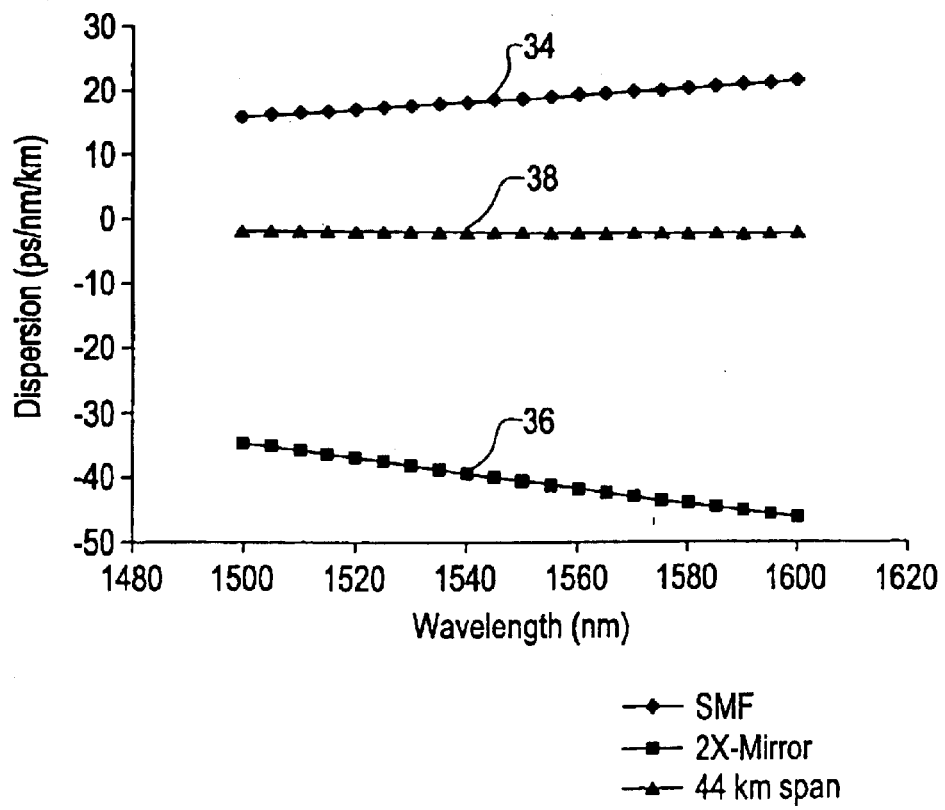
FIG. 8 is an illustration of a compensated link total dispersion versus wavelength in which the link includes waveguide fibers having characteristics in accord with the invention incorporated at a 2:1 ratio of positive total dispersion fiber to negative total dispersion fiber.

A 44 km system was modeled using the standard and dispersion compensating waveguide fiber in a length ratio of 2 to 1. The modeling results are shown in FIG. 8. Curve 34 in FIG. 8 shows the dispersion versus wavelength of the standard fiber. Curve 36 in FIG. 8 shows the dispersion versus wavelength of the compensating fiber. The dispersion versus wavelength of the 44 km link is seen in curve 38 of FIG. 8 to be essentially constant about −2 ps/nm-km. Essentially constant means dispersion slope magnitude of the link is less than or equal to 0.01 ps/nm$^2$-km. The fiber made in accord with the invention provides exact compensation of the standard fiber over the entire wavelength range 1500 nm to 1600 nm.

Figure 11:
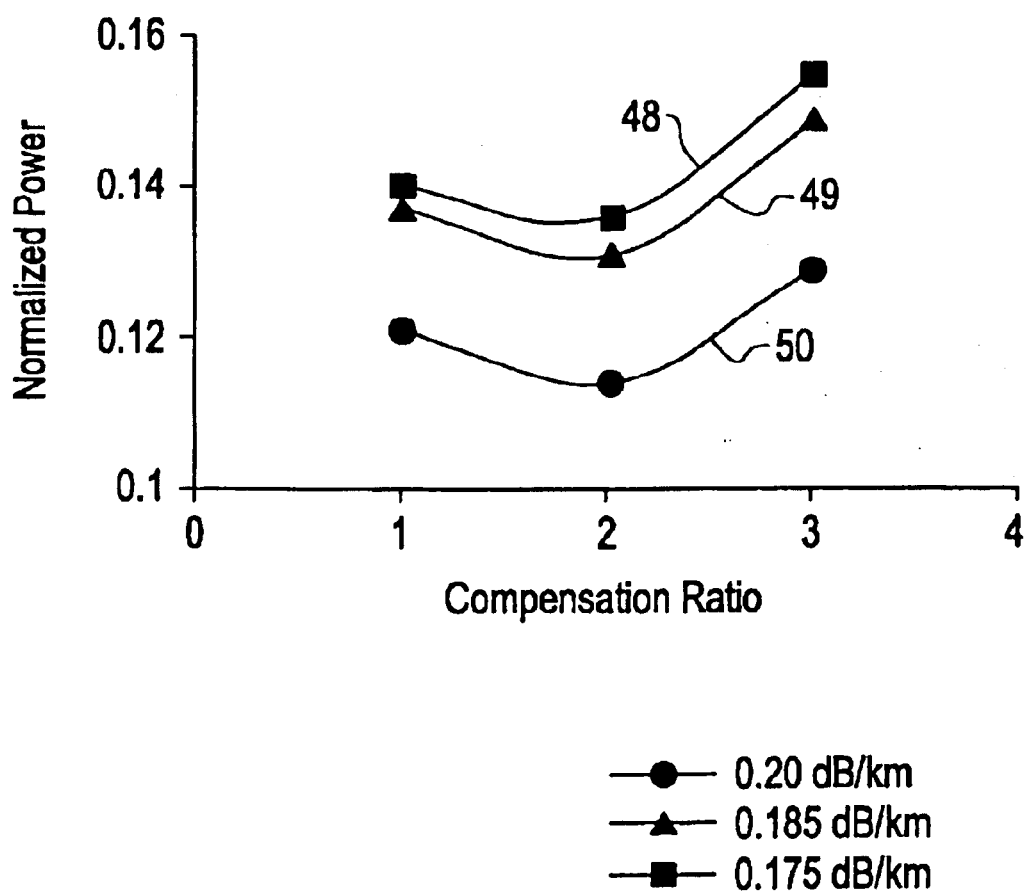
FIG. 11 is an illustration of the relative performance of waveguide fiber designed to compensate link total dispersion.

Further modeling of waveguide fibers made in accord with the invention was carried out to determine the relative benefits of increasing or decreasing the compensation ratio, that is, the ratio of the length of standard fiber to the length of compensating fiber in the link. Compensating waveguide fibers were designed for use in a modeled link at a 1:1, 2:1, and 3:1 length ratio. Model results are shown in FIG. 11. The horizontal axis is the compensation ratio, the number 1 meaning a length ratio of 1:1. 2 a length ratio of 2:1, and 3 a length ratio of 3:1. The vertical axis shows normalized power, which is defined as light power P multiplied by the non-linear refractive index coefficient $n_2$ and divided by the effective area $A_{eff}$. That is, normalized power=$Pn_2/A_{eff}$. For three choices of standard fiber attenuation, the 2:1 ratio provided for the lowest normalized power. Curve 48 of FIG. 11, corresponding to a standard fiber attenuation of 0.20 dB/km, has a minimum of about 0.135 normalized units at the 2:1 compensation point. Curve 49 of FIG. 11, corresponding to a standard fiber attenuation of 0.185 dB/km, has a minimum of about 0.13 normalized units at the 2:1 compensation point. Curve 50 of FIG. 11, corresponding to a standard fiber attenuation of 0.175 dB/km, has a minimum of about 0.115 normalized units at the 2:1 compensation point. This indicates that the non-linear dispersion effects such as modulation instability, four wave mixing, and cross phase modulation will be lowest for compensating fibers exhibiting a total dispersion and total dispersion slope that results in a 2:1 length ratio in the link, as is the case for the compensating fibers of the invention. The optimum length ratio lies in the range of 1:1 to 3:1.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. A telecommunications link comprising:
   a transmitter for generating light signals;
   a receiver for receiving the light signals;
   at least two lengths of optical waveguide fiber optically joined in series to form a link length, the link length having a first end optically coupled to said transmitter and a second end optically coupled to said receiver to transport the light signals therebetween; wherein,
   a first one of said at least two lengths of optical fiber has a positive total dispersion and a positive total dispersion slope, and a second one of said at least two lengths has a refractive index profile selected to provide a negative total dispersion and negative total dispersion slope, wherein,
   the first and second lengths are selected such that said link has a total dispersion of magnitude less than 10 ps/nm-km, and a total dispersion slope of magnitude less than 0.01 ps/nm$^2$-km, over a pre-selected wavelength range.

2. The telecommunications link of claim 1 wherein the pre-selected wavelength range is 1280 nm to 1650 nm.

3. The telecommunications link of claim 1 wherein the pre-selected wavelength range is 1500 mn to 1650 nm.

4. The telecommunications link of claim 1 wherein the first one of the at least two lengths is longer than the second one of at least two lengths.

5. The telecommunications link of claim 4 wherein the first one of the at least two lengths and the second one of the at least two lengths are present in the link in a ratio in the range from 1:1 to 3:1.

6. The telecommunications link of claim 1 wherein at 1550 nm the total dispersion of the first one of the at least two lengths is in the range of 8 ps/nm-km to 25 ps/nm-km and the total dispersion slope is in the range of 0.05 ps/nm$^2$-km to 0.085 ps/nm$^2$-km.

7. The telecommunications link of claim 6 wherein at 1550 nm the total dispersion of the second length of the at least two lengths is in the range of −30 ps/nm-km to −60 ps/nm-km and the total dispersion slope is in the range of −0.09 ps/nm$^2$-km to −0.18 ps/nm$^2$-km.

8. The telecommunications link of claim 7 wherein the link length is not less than 40 km, the pre-selected wavelength range is 1500 nm to 1650 nm, the total dispersion magnitude over the range 1500 nm to 1650 nm is less than 4 ps/nm-km, and the total dispersion slope magnitude over the wavelength range 1500 nm to 1650 nm is less than 0.01 ps/nm$^2$-km.

9. The telecommunications link of claim 8 wherein the total dispersion slope magnitude of the link over the range 1500 nm to 1650 is less than 0.005 ps/nm$^2$-km.

10. The telecommunications link of claim 8 wherein the total dispersion of said link is negative.

11. The telecommunications link of claim 1 wherein the first one of said at least two lengths is optically coupled to the transmitter.

12. The telecommunications link of claim 11 further including a third length of waveguide fiber having positive total dispersion and positive total dispersion slope, wherein said third length is optically coupled to the receiver.

13. The telecommunications link of claim 1 wherein the refractive index profile of the second one of said at least two lengths has a core region surrounded by and in contact with a clad layer, wherein said core region includes at least three segments, a central segment, a first annular segment surrounding the central segment, and a second annular segment surrounding the first annular segment.

14. A telecommunications link, comprising:

a transmitter for generating light signals;

a receiver for receiving the light signals;

at least two lengths of optical waveguide fiber optically joined in series to form a link length, the link length having a first end optically coupled to said transmitter and a second end optically coupled to said receiver to transport the light signals therebetween; wherein, a first one of said at least two lengths of optical fiber has a positive total dispersion in the range of 8 ps/nm-km to 25 ps/nm-km at 1550 nm and a positive total dispersion slope in the range of 0.05 ps/nm$^2$-km to 0.085 ps/nm$^2$-km at 1550 nm, and a second one of said at least two lengths has a refractive index profile having a core region surrounded by and in contact with a clad layer, wherein said core region includes at least three segments, a central segment, a first annular segment surrounding the central segment, and a second annular segment surrounding the first annular segment and the refractive index profile is selected to provide a negative total dispersion in the range of −30 ps/nm-km to −60 ps/nm-km at 1550 nm and the total dispersion slope in the range of −0.09 ps/nm$^2$-km to −0.18 ps/nm$^2$-km at 1550 nm, wherein the first and second lengths are selected such that said link has a total dispersion of magnitude less than 10 ps/nm-km, and a total dispersion slope of magnitude less than 0.01 ps/nm$^2$-km, over a pre-selected wavelength range between 1280 nm to 1650 nm.

* * * * *